United States Patent
Basara

(10) Patent No.: US 11,413,523 B2
(45) Date of Patent: Aug. 16, 2022

(54) MODULAR AUGMENTED REALITY CONTROLLER

(71) Applicant: David Basara, Batavia, NY (US)

(72) Inventor: David Basara, Batavia, NY (US)

( * ) Notice: Subject to any disclaimer, the term of this patent is extended or adjusted under 35 U.S.C. 154(b) by 0 days.

(21) Appl. No.: 17/123,334

(22) Filed: Dec. 16, 2020

(65) Prior Publication Data

US 2021/0178255 A1    Jun. 17, 2021

Related U.S. Application Data

(60) Provisional application No. 62/948,910, filed on Dec. 17, 2019.

(51) Int. Cl.
| | | |
|---|---|---|
| *A63F 13/245* | (2014.01) | |
| *A63F 13/235* | (2014.01) | |
| *A63F 13/98* | (2014.01) | |
| *A63F 13/26* | (2014.01) | |
| *A63F 13/211* | (2014.01) | |

(52) U.S. Cl.
CPC .......... *A63F 13/245* (2014.09); *A63F 13/211* (2014.09); *A63F 13/235* (2014.09); *A63F 13/26* (2014.09); *A63F 13/98* (2014.09)

(58) Field of Classification Search
CPC .... A63F 13/245; A63F 13/211; A63F 13/235; A63F 13/26; A63F 13/98; A63F 13/837
See application file for complete search history.

(56) References Cited

U.S. PATENT DOCUMENTS

| | | | |
|---|---|---|---|
| 6,279,906 B1 * | 8/2001 | Sanderson | A63F 13/02 273/148 B |
| 7,758,424 B2 * | 7/2010 | Riggs | A63F 13/24 463/37 |
| 8,187,095 B2 * | 5/2012 | Wong | A63F 13/06 463/36 |
| 9,958,934 B1 * | 5/2018 | Mullen | A63F 13/212 |
| 10,318,013 B1 * | 6/2019 | Banks | G06F 3/0604 |
| 10,780,343 B2 * | 9/2020 | Chou | A63F 13/98 |
| 11,103,776 B2 * | 8/2021 | Chang | A63F 13/98 |
| 2006/0172802 A1 * | 8/2006 | Hussaini | A63F 13/235 463/39 |
| 2011/0105231 A1 * | 5/2011 | Ambinder | A63F 13/24 463/38 |
| 2014/0121022 A1 * | 5/2014 | Shah | A63F 13/50 463/38 |
| 2015/0234398 A1 * | 8/2015 | Harris | B25J 9/0003 700/250 |
| 2018/0185749 A1 * | 7/2018 | Kidakarn | A63F 13/22 |

* cited by examiner

*Primary Examiner* — Thomas J Hong
*Assistant Examiner* — Carl V Larsen
(74) *Attorney, Agent, or Firm* — Tatonetti IP

(57) ABSTRACT

A modular and dynamic augmented reality controller is implemented in which the controller is configurable with diverse gaming consoles while providing an augmented reality experience. The controller may be shaped to serve a specific augmented reality experience such as, for example, a gun, but other implementations and designs are also possible. The controller comes with a display screen that is attached to a barrel of the gun so that the user can view the screen while moving and turning. In turn, the user's vantage points on the screen are manipulated based on the user's physical movements, which are relayed to the gaming console via various sensors on the controller. Multiple and distinct module interfaces may connect to the controller to enable the controller to communicate with a given gaming console.

11 Claims, 9 Drawing Sheets

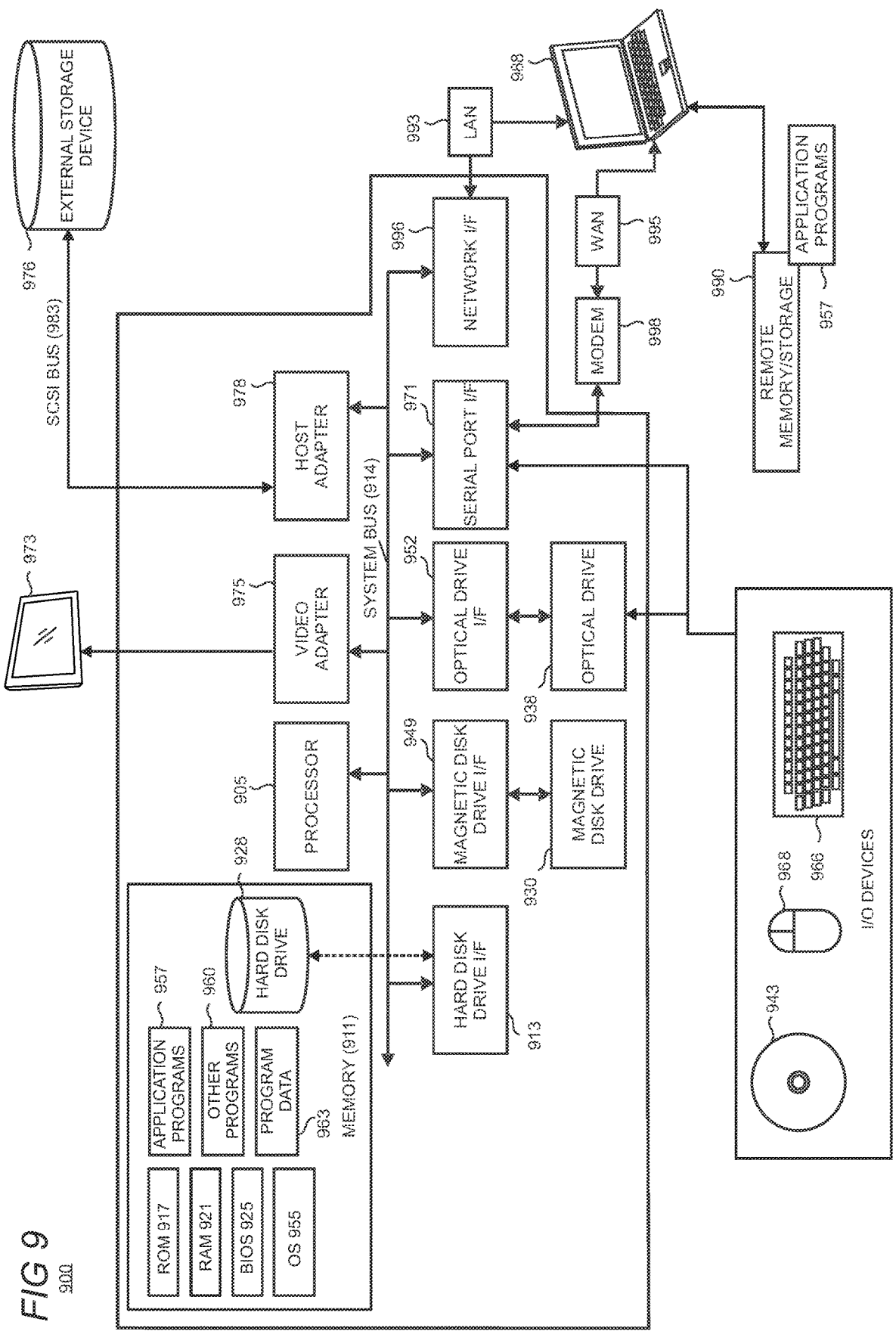

MODULAR AUGMENTED REALITY CONTROLLER

CROSS-REFERENCE TO RELATED APPLICATIONS

This non-provisional utility patent application claims the benefit of and priority to U.S. Provisional Application Ser. No. 62/948,910, entitled "Augmented Reality Controller," filed on Dec. 17, 2019, the entire contents of which is hereby incorporated herein by reference.

BACKGROUND

Gaming controllers are typically limited in nature in that the controller can be used for a single gaming console system and often times for a limited number of games for that console. This may limit users to certain gaming consoles since they are familiar with that console's controls, button placements, and other specific configurations.

SUMMARY

A modular and dynamic augmented reality controller is implemented in which the controller is configurable with diverse gaming consoles while providing an augmented reality experience. The controller may be shaped to serve a specific augmented reality experience such as, for example, a gun, but other implementations and designs are also possible. The controller comes with a display screen that is attached to a barrel of the gun so that the user can view the screen while moving and turning. In turn, the user's vantage points on the screen are manipulated based on the user's own physical movements, which are relayed to the gaming console via various sensors on the controller.

The augmented reality controller is modular to enhance the dynamicity of the controller. Specifically, a handle attached to the gun is removable and replaceable with another handle which may, for example, be used for a different gaming console. For example, the original handle may be configured with X-Box® controller buttons and generate data signals that correspond to the X-Box's parameters. The original handle may be removed if, for example, the user wishes to play with a different gaming console, like PlayStation® or Nintendo®, in which a PlayStation® modular handle may be connected and attached to the augmented reality controller's receptacle for use with the PlayStation® console. Each handle is configured with buttons that are specific to a given gaming console, so that buttons for a different console are not present for one currently in use. Thus, the removability of the controller's handle provides the modularity of the controller and the convenience of the system. The augmented reality controller may communicate with a respective gaming console by either leveraging a network interface inside a respective modular handle, or by using its own network interface that is connectable with the gaming console's network interface. In either case, the modular handle or the controller may have extensibility to the gaming console in use so that the two devices can communicate.

The base of the controller, which is the component that remains constant and is not modular, may include buttons that overlap with and are common among multiple gaming consoles, such as the start button, select button, R/L buttons, and a joystick. Furthermore, the augmented reality controller's battery may be removable, rechargeable, and replaceable with a second battery while the original one is charging. In the present implementation, the battery is in the form of the magazine clip.

The augmented reality controller is configured with various sensors that detect the controller's movement, such as forward and back, lateral movement, and turning, which is transferred as input to the gaming console similar to an augmented reality headset, or head mounted display (HMD) device. And since the controller comes equipped with a display screen, the user constantly sees the game of play, rather than turning their head to find a stagnant television screen.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

FIG. 9 shows a simplified block diagram of a computing device which may be used to implement the preset modular augmented reality controller.

Like reference numerals indicate like elements in the drawings. Elements are not drawn to scale unless otherwise indicated.

DETAILED DESCRIPTION

Figure 1:
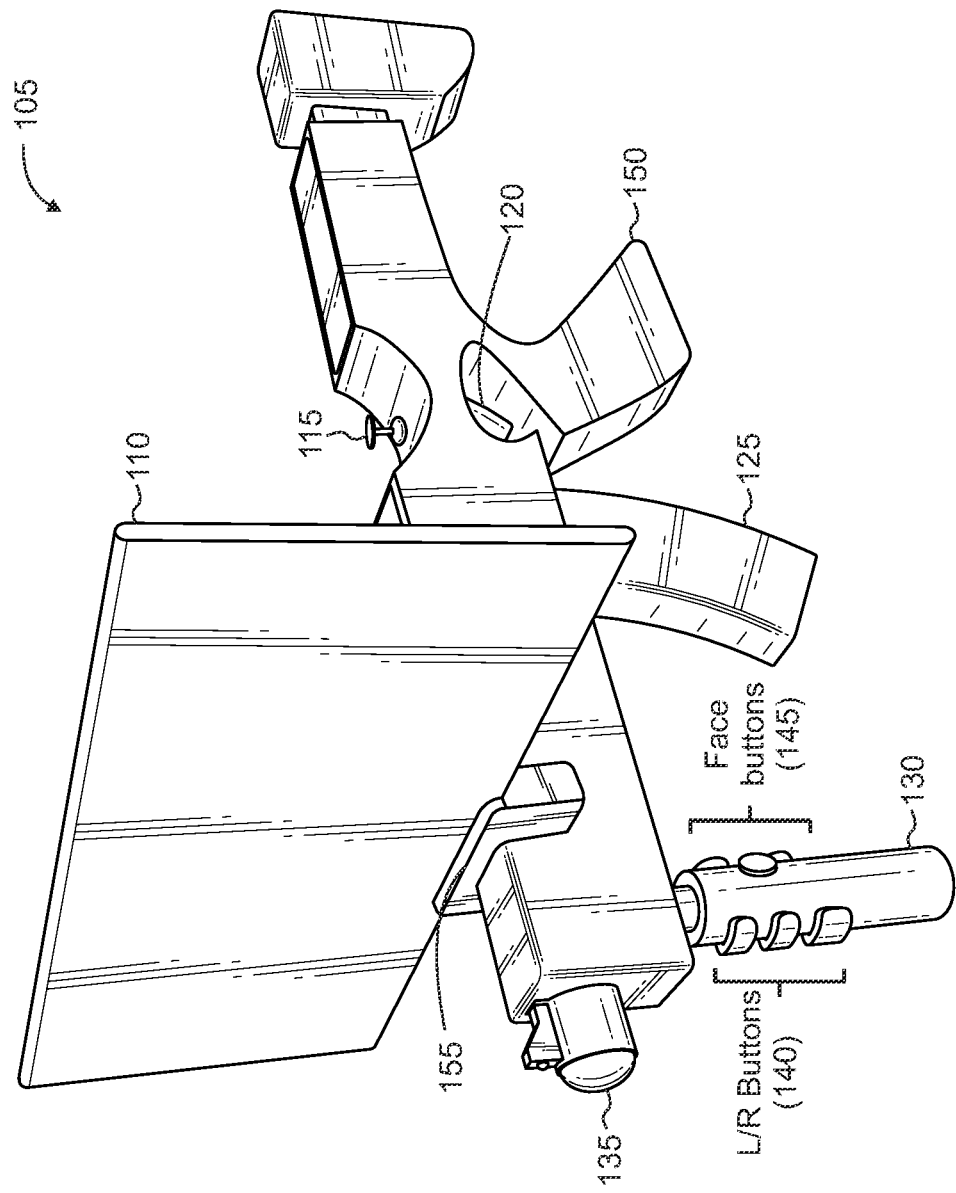
FIG. 1 shows an illustrative representation of a controller in the form of a remote control gun for use with a gaming console.
Figure 2:
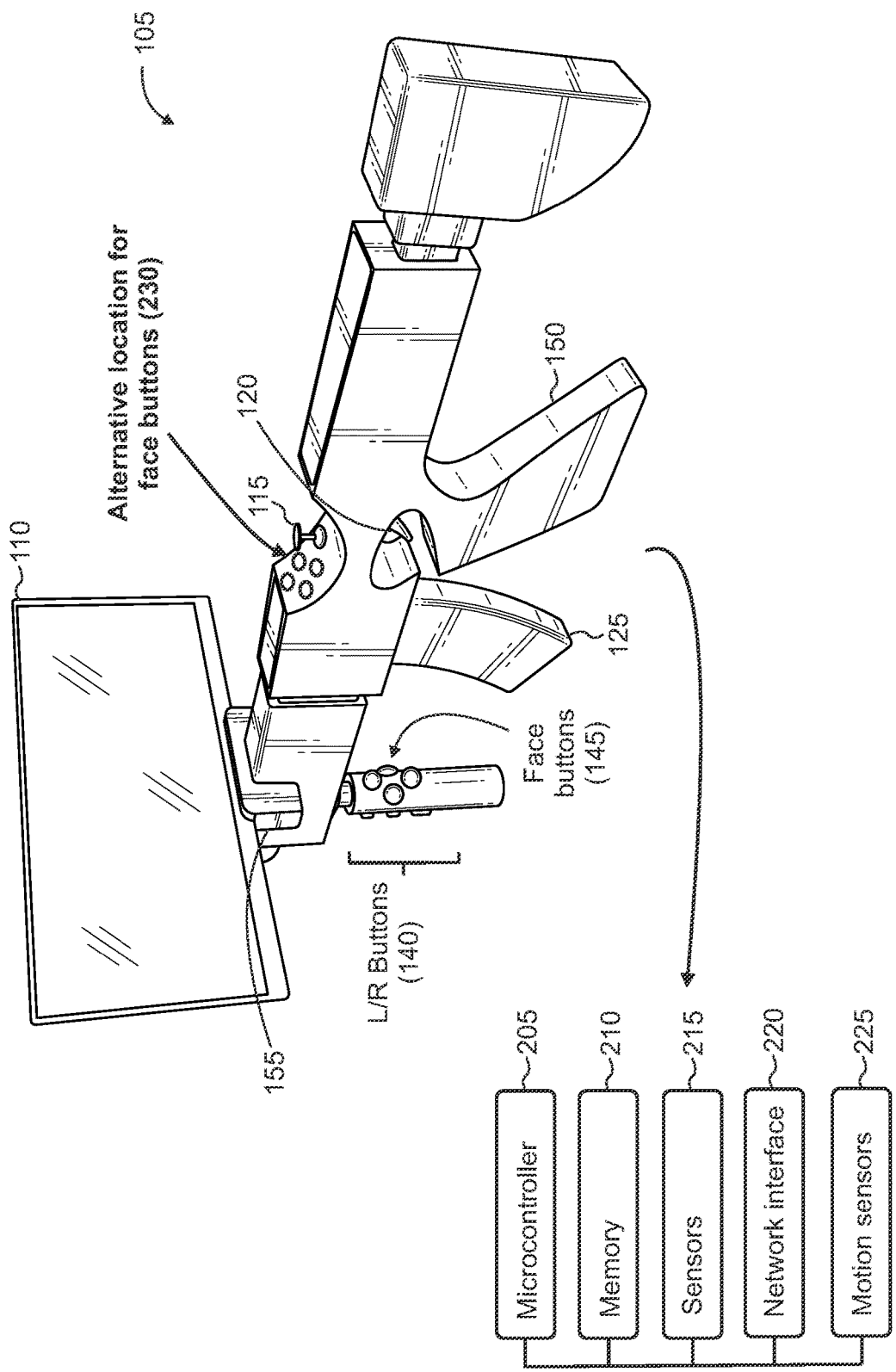
FIG. 2 shows an illustrative representation of the controller's hardware.

FIGS. 1 and 2 show illustrative representations of an augmented reality controller 105 that is operable with a gaming console (not shown). The controller is in the form of a gun which a user can hold in their hands while playing, for example, a first person shooter (FPS) video game, such that the gun design enhances—or augments—the user's gaming experience. The controller includes a display 110 that is attached to a barrel of the gun using, for example, a clamp 155. The display is attached to the gun so that the user is able to properly play the game even while maneuvering or turning. That way, the user is not restricted to a fixed television screen distinct from the controller while the user moves in the augmented reality world. The clamp map be configurable such that the user can re-position the clamp at other locations along the barrel, or the use can remove the clamp and display altogether to play on a television screen.

The augmented reality controller 105 includes a joystick 115, trigger 120, trigger handle 150, battery 125 designed as a magazine clip, and a modular handle 130 which includes L/R buttons 140 and face buttons 145. The buttons, joystick, and trigger are utilized by the user to control their character or avatar and play a video game on the video game console. The buttons may operate as switches which cause a signal to be transmitted to the video game console so that the user is controlling their character in real-time. While a modular handle is shown and described herein, the modularity of the handle is an example and other types and components may be modular to facilitate the purposes herein. For example, a modular insert may be used that is inserted into a receptacle of a controller and which enables the controller to be used with a given gaming console. The insert may be used with a typical gaming controller that has two handles, trackpad, face pad, and joysticks. In this regard, the modular handle or insert may be generally referred to as a modular interface.

The augmented reality controller 105 is further configured within its interior with various hardware components, including a microcontroller 205, memory 210, sensors 215, network interface 220, and motion sensors 225. The memory may store data and instructions which are executed by the microcontroller. The network interface may include a wireless interface, such as a Wi-Fi controller, near field communication (NFC) transmitter, and a Bluetooth® transmitter for communicating with a router or the gaming console.

Using the various sensors 215 and motion sensors 225, the microcontroller may gather movement data using a digital accelerometer and gyroscope and cross reference that data with other distance sensors to determine if the augmented reality controller 105 has moved and by how much. The movement, depending on how fast or slow, may be translated into a resistance value determined by the typical minimum and maximum resistance values of the controller's joystick potentiometers. This configuration enables an augmented reality experience for scenarios in which joysticks were previously used. In any case, the joystick may still be usable either simultaneously with the sensory movement data, alternatively based on the user's selection, or for other functionality. The generic "sensors" 215 shown in FIG. 2 represents other possible sensors which may be used with the controller 105, such as proximity sensors, LIDAR (light detection and ranging), etc. The translation of the user's movement into the gaming environment creates the augmented reality experience, in which the user can use the display 110 to maintain the gaming experience. In contrast, use of a fixed television may hinder the user's gaming experience, such as to shift their head to view the screen or lose sight of the television entirely.

FIG. 2 also shows an alternative location for the face buttons 230. Typically, the face buttons are standard among various gaming consoles, such as X-Box®, Playstation®, and Nintendo®, in which four buttons are in the shape of a diamond. Thus, placing the face buttons in the alternative location may enable one of the user's hands to easily press those buttons, if necessary, while holding the gun, and the location also provides for switch handed use (e.g., left- and right-handed users). The face buttons 145 or 230 may or may not be simultaneously present depending on the implementation. For example, both sets of face buttons may be present, or just one location of face buttons.

Figure 3:
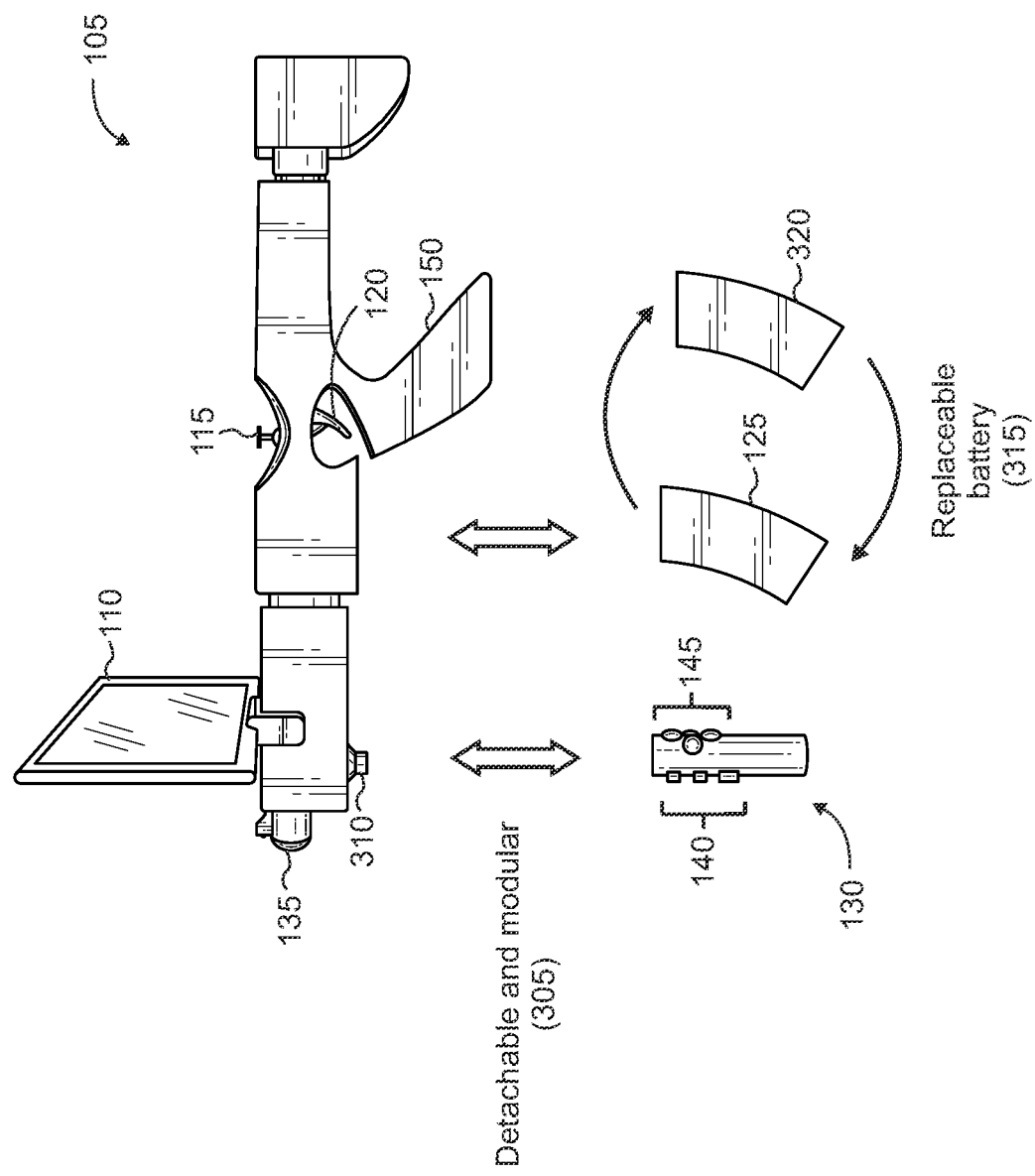
FIG. 3 shows an illustrative representation of the controller's modularity.

FIG. 3 shows an illustrative representation in which the modular components of the augmented reality controller 105 are detached from the controller's base. For example, the modular handle 130 is detached from the receptacle 310 on the controller, and the battery 125 is removed and replaceable by another battery 320, as illustratively shown by numeral 315.

Figure 4:
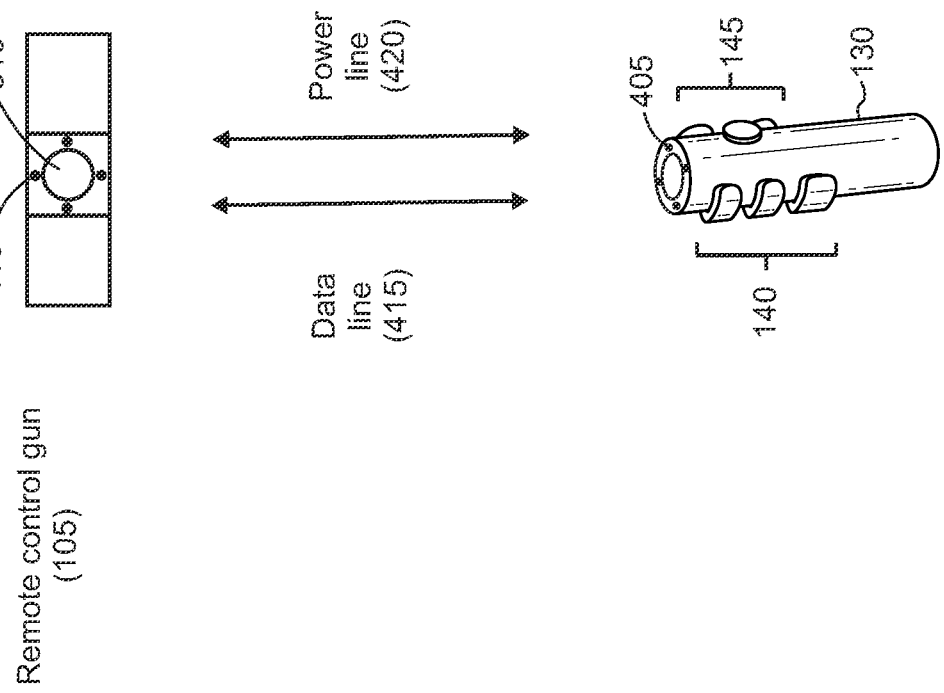
FIG. 4 shows an illustrative representation of the connection points between a modular interface and the controller.

FIG. 4 shows an illustrative representation in which the modular handle 130 includes contact points 405 that correspond and form a connection with the controller's contact points 410, which are on a base of the receptacle 310. The contact points include data and power lines 415, 420, respectively, on which the controller provides power to the modular handle and data is passed to and from the modular handle. For example, button presses may cause the modular handle to transmit the signals to the controller. Alternatively, inputs from the controller 105, such as sensory user movements, inputs at the joystick or other buttons, may be transmitted to the modular handle. Depending on the specific configuration, the modular handle or the controller may have the radio configuration, such as the network interface, to communicate with the gaming console. The modular handle may fit within the controller's receptacle using various connection mechanisms, such as a press or friction fit, tab and notch, magnetic connection, or any combination thereof.

While FIGS. 3 and 4 show the modular handle 130 and battery being the modular components, other aspects and buttons of the controller 105 may be modular. For example, the joystick 115 and alternative location for the face buttons 230 (FIG. 2) may also be modular and therefore removably attachable to the controller. The joystick and face buttons 230 may be positioned on their own component that attaches to a receptacle on the controller, in which contact points like those shown in FIG. 4 may likewise be used for transmitting data and power. The removable component may be the shape of the indent of the controller as shown in the drawings.

Figure 5:
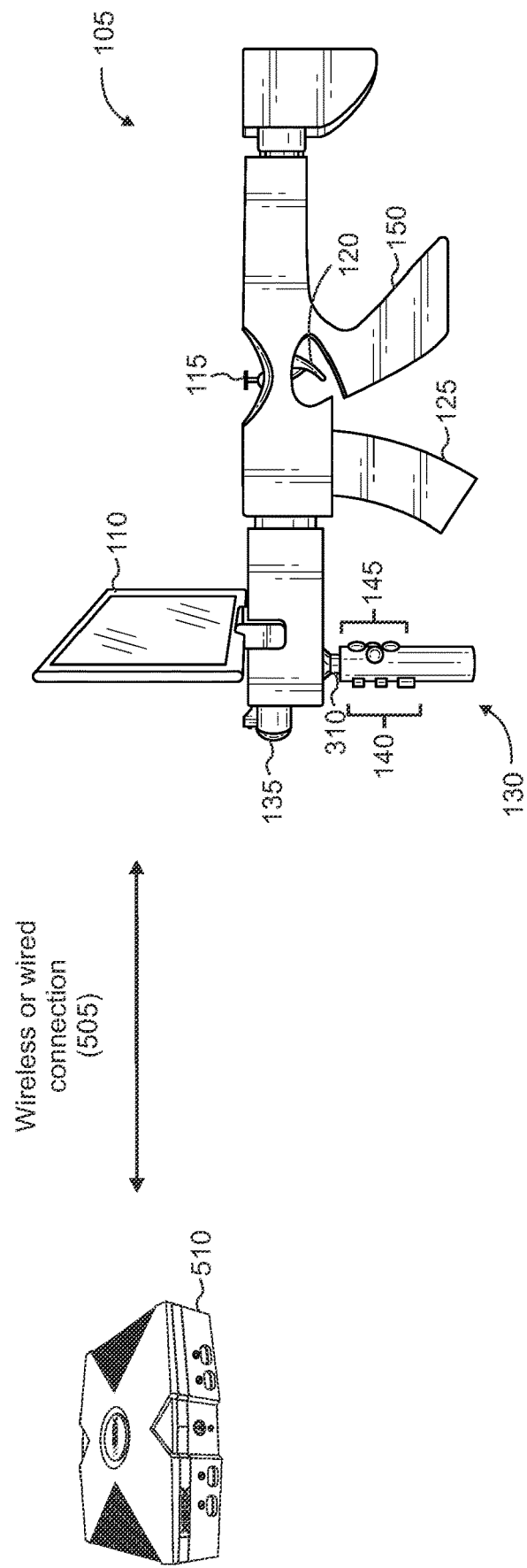
FIG. 5 shows an illustrative representation in which the controller communicates with a gaming console.

FIG. 5 shows an illustrative representation in which the augmented reality controller 105 is configured to form a wireless or wired connection with the gaming console 510. As discussed above with respect to FIG. 2, the controller is adapted with a network interface 220 to communicate with the gaming console. For example, the controller may enable the user to control a character and play a video game, but the gaming console may likewise communicate the video game's virtual world with the controller's display so the user can view the video game on the screen. Wireless connectivity occurs when the devices are within network connectivity range to each other.

Figure 6:
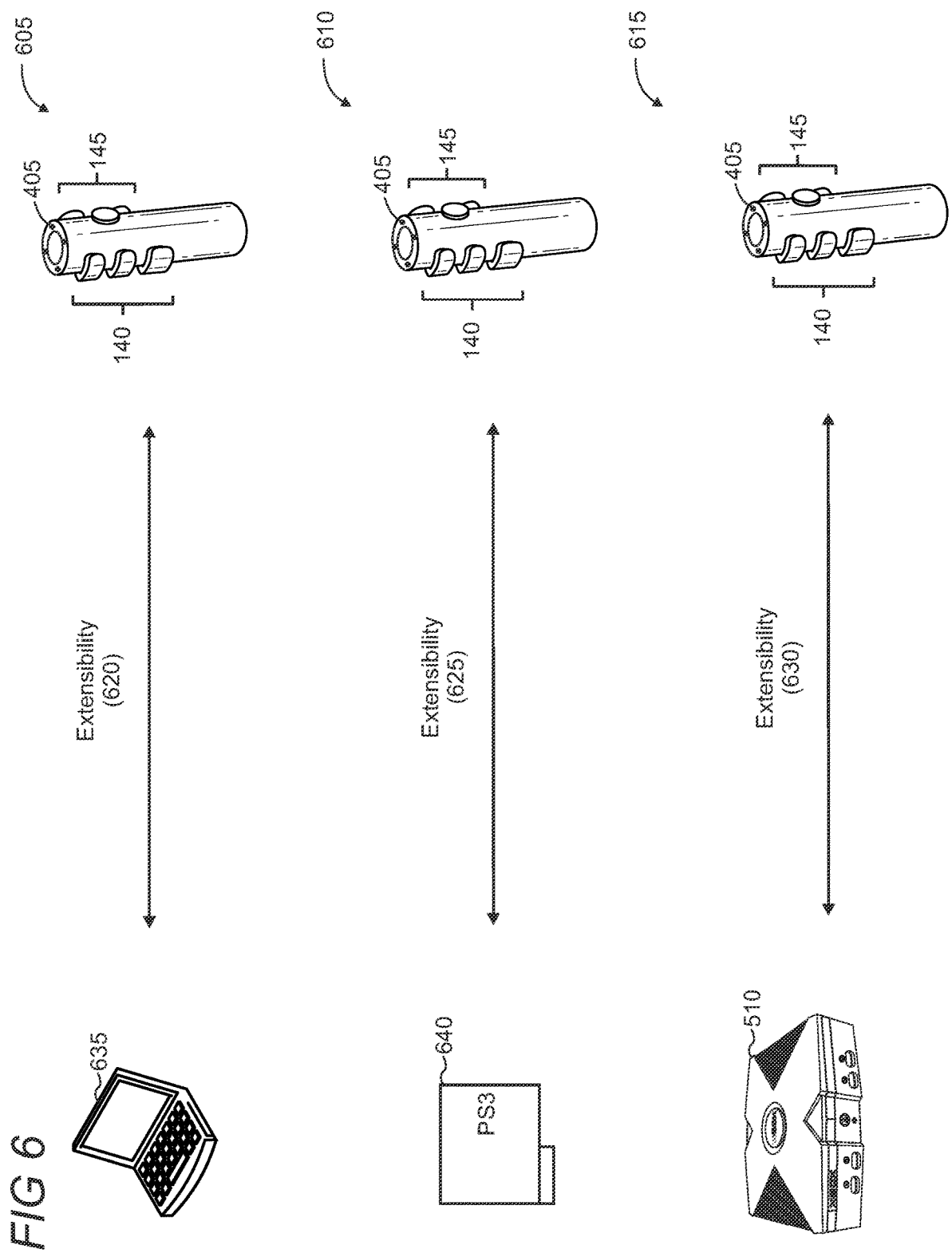
FIG. 6 shows an illustrative representation in which distinct modular interfaces are configured with extensibility to a specific gaming console.

FIG. 6 shows an illustrative representation in which distinct modular handles 605, 610, and 615 can be configured with extensibility 620, 625, and 630 with specific gaming consoles 635, 640, and 510, respectively. Each modular handle enables the controller 105 to be used with a given gaming console. So, for example, one gaming console may have distinct buttons that are specific to that console, in which case the modular handle for that gaming console will have those distinct buttons, parameters, and other configurations. The use of the modular handle enables the controller to dynamically connect to and be used with gaming consoles that are associated with different manufacturers, such as PlayStation®, X-Box®, Nintendo®, or a personal computer. In some implementations, an initial modular handle 610 may be connected to and used with an initial gaming console, such as the PlayStation® 640. If the user decides to use the controller 105 with another gaming console, then the user can remove the initial modular handle 610 and attach a subsequent modular handle 615 to connect to, for example, the X-Box® 510.

Depending on the implementation, the modular handles may be configured with the network interface to communicate with the gaming console, in which case inputs from standard and permanent buttons on the controller may be transmitted to the modular handle for transmission to the gaming console. Alternatively, the base of the controller may be universally adaptable and recognizable by each gaming console, and the modular handle is utilized to incorporate the specific gaming console's buttons to the controller.

Figure 7:
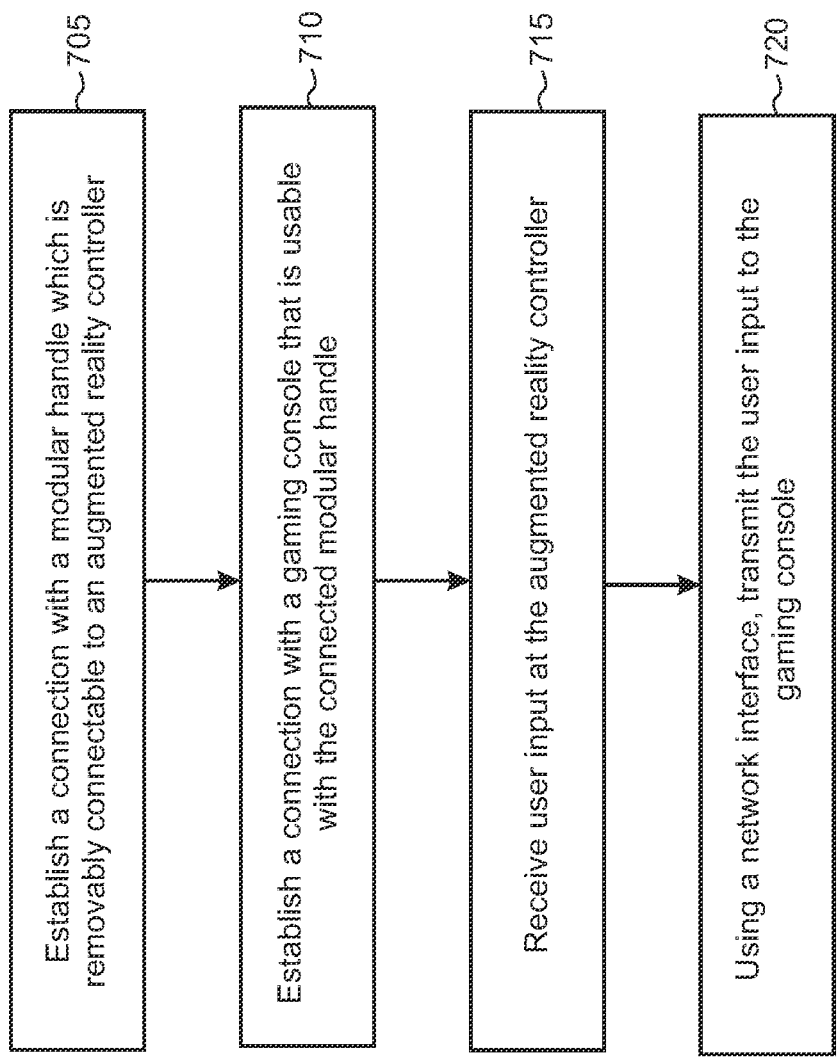
FIG. 7 shows an illustrative process performed by one or more of the gaming console, the controller, or the modular interface.

FIG. 7 shows an illustrative process 700 which may be performed by the augmented reality controller 105 in communication with a gaming console. In step 705, the controller establishes a connection with a modular handle which is removably connectable to the controller. In step 710, the controller establishes a connection with a gaming console that is usable with the connected modular handle. The modular handle may be configured specifically for use with the gaming console, such as button configuration and types. In step 715, the controller receives user input, such as at the controller's standard input mechanisms or at the modular handle. In step 720, the controller, using a network interface, transmits the user input to the gaming console. The network interface may be, for example, within the controller itself or within the modular handle.

Figure 8:
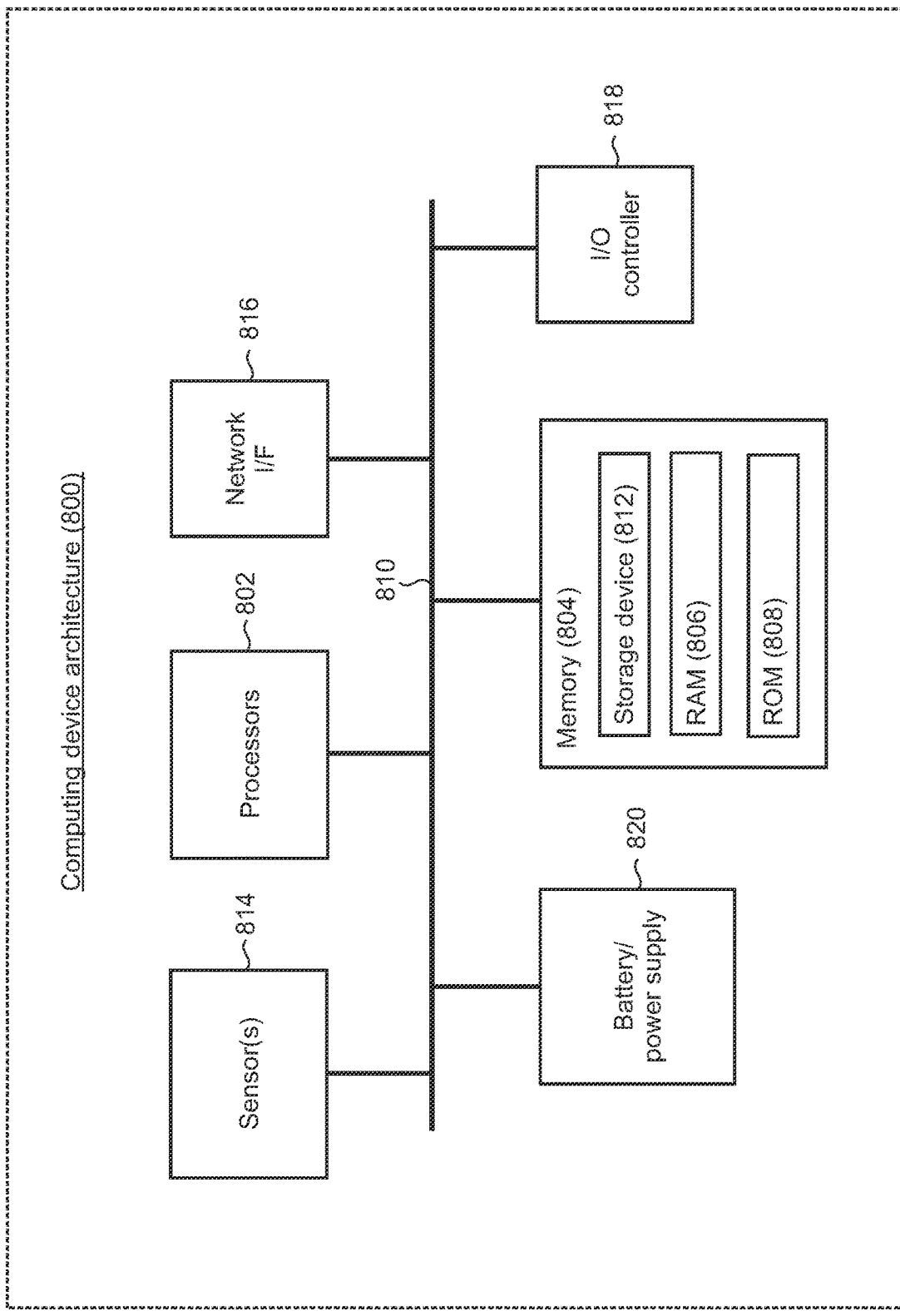
FIG. 8 shows a simplified block diagram of a computing device which may be used to implement the present modular augmented reality controller.

FIG. 8 shows an illustrative architecture 800 for a device, such as a gaming controller, gaming console, smartphone, tablet, or laptop computer capable of executing the various features described herein. The architecture 800 illustrated in FIG. 8 includes one or more processors 802 (e.g., central processing unit, dedicated AI chip, graphics processing unit, etc.), a system memory 804, including RAM (random access memory) 806, ROM (read only memory) 808, and long-term storage devices 812. The system bus 810 operatively and functionally couples the components in the architecture 800. A basic input/output system containing the basic routines that help to transfer information between elements within the architecture 800, such as during startup, is typically stored in the ROM 808. The architecture 800 further includes a long-term storage device 812 for storing software code or other computer-executed code that is utilized to implement applications, the file system, and the operating system. The storage device 812 is connected to the processor 802 through a storage controller (not shown) connected to the bus 810. The storage device 812 and its associated computer-readable storage media provide non-volatile storage for the architecture 800. Although the description of computer-readable storage media contained herein refers to a long-term storage device, such as a hard disk or CD-ROM drive, it may be appreciated by those skilled in the art that computer-readable storage media can be any available storage media that can be accessed by the architecture 800, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 800.

According to various embodiments, the architecture 800 may operate in a networked environment using logical connections to remote computers through a network. The architecture 800 may connect to the network through a network interface unit 816 connected to the bus 810. It may be appreciated that the network interface unit 816 also may be utilized to connect to other types of networks and remote computer systems. The architecture 800 also may include an input/output controller 818 for receiving and processing input from a number of other devices, including a keyboard, mouse, touchpad, touchscreen, control devices such as buttons and switches or electronic stylus (not shown in FIG. 8). Similarly, the input/output controller 818 may provide output to a display screen, user interface, a printer, or other type of output device (also not shown in FIG. 8).

It may be appreciated that any software components described herein may, when loaded into the processor 802 and executed, transform the processor 802 and the overall architecture 800 from a general-purpose computing system into a special-purpose computing system customized to facilitate the functionality presented herein. The processor 802 may be constructed from any number of transistors or other discrete circuit elements, which may individually or collectively assume any number of states. More specifically, the processor 802 may operate as a finite-state machine, in response to executable instructions contained within the software modules disclosed herein. These computer-executable instructions may transform the processor 802 by specifying how the processor 802 transitions between states, thereby transforming the transistors or other discrete hardware elements constituting the processor 802.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 800 in order to store and execute the software components presented herein. It also may be appreciated that the architecture 800 may include other types of computing devices, including wearable devices, handheld computers, embedded computer systems, smartphones, PDAs, and other types of computing devices known to those skilled in the art. It is also contemplated that the architecture 800 may not include all of the components shown in FIG. 8, may include other components that are not explicitly shown in FIG. 8, or may utilize an architecture completely different from that shown in FIG. 8.

FIG. 9 is a simplified block diagram of an illustrative computer system 900 such as a video game console, smartphone, tablet computer, laptop computer, or personal computer (PC) which the present disclosure may be implemented. Computer system 900 includes a processor 905, a system memory 911, and a system bus 914 that couples various system components including the system memory 911 to the processor 905. The system bus 914 may be any of several types of bus structures including a memory bus or memory controller, a peripheral bus, or a local bus using any of a variety of bus architectures. The system memory 911 includes read only memory (ROM) 917 and random access memory (RAM) 921. A basic input/output system (BIOS) 925, containing the basic routines that help to transfer information between elements within the computer system 900, such as during startup, is stored in ROM 917. The computer system 900 may further include a hard disk drive 928 for reading from and writing to an internally disposed hard disk, a magnetic disk drive 930 for reading from or writing to a removable magnetic disk (e.g., a floppy disk), and an optical disk drive 938 for reading from or writing to a removable optical disk 943 such as a CD (compact disc), DVD (digital versatile disc), or other optical media. The hard disk drive 928, magnetic disk drive 930, and optical disk drive 938 are connected to the system bus 914 by a hard disk drive interface 946, a magnetic disk drive interface 949, and an optical drive interface 952, respectively. The drives and their associated computer-readable storage media provide non-volatile storage of computer-readable instructions, data structures, program modules, and other data for the computer system 900. Although this illustrative example includes a hard disk, a removable magnetic disk 933, and a removable optical disk 943, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present disclosure. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 943, ROM 917, or RAM 921, including an operating system 955, one or more application programs 957, other program modules 960, and program data 963. A user may enter commands and information into the computer system 900 through input devices such as a keyboard 966, pointing device (e.g., mouse) 968, or touch-screen display 973. Other input devices may include a microphone, joystick, game pad, satellite dish, scanner, trackball, touchpad, touch-sensitive device, voice-command module or device, user motion or user gesture capture device, or the like. These and other input devices are often connected to the processor 905 through a serial port interface 971 that is coupled to the system bus 914, but may be connected by other interfaces, such as a parallel port, game port, or universal serial bus (USB). A monitor 973 or other type of display device is also connected to the system bus 914 via an interface, such as a video adapter 975. In addition to the monitor 973, personal computers typically include other peripheral output devices (not shown), such as speakers and printers. The illustrative example shown in FIG. 9 also includes a host adapter 978, a Small Computer System Interface (SCSI) bus 983, and an external storage device 976 connected to the SCSI bus 983.

The computer system 900 is operable in a networked environment using logical connections to one or more remote computers, such as a remote computer 988. The remote computer 988 may be selected as another personal computer, a server, a router, a network PC, a peer device, or other common network node, and typically includes many or all of the elements described above relative to the computer system 900, although only a single representative remote memory/storage device 990 is shown in FIG. 9. The logical connections depicted in FIG. 9 include a local area network (LAN) 993 and a wide area network (WAN) 995. Such networking environments are often deployed, for example, in offices, enterprise-wide computer networks, intranets, and the Internet.

When used in a LAN networking environment, the computer system 900 is connected to the local area network 993 through a network interface or adapter 996. When used in a WAN networking environment, the computer system 900 typically includes a broadband modem 998, network gateway, or other means for establishing communications over the wide area network 995, such as the Internet. The broadband modem 998, which may be internal or external, is connected to the system bus 914 via a serial port interface 971. In a networked environment, program modules related to the computer system 900, or portions thereof, may be stored in the remote memory storage device 990. It is noted that the network connections shown in FIG. 9 are illustrative and other means of establishing a communications link between the computers may be used depending on the specific requirements of an application of the present disclosure.

Various exemplary embodiments are disclosed herein. In one exemplary embodiment, disclosed is a modular augmented reality video game controller, comprising: a casing having a connection point; one or more processors stored within the casing; one or more sensors operatively coupled to the one or more processors; and one or more hardware-based memory devices having instructions which are executable by the one or more processors; a network interface which enables the video game controller to connect to an initial computing device; and a modular interface that removably connects to the casing's connection point, wherein the initial modular interface includes input mechanisms which a user uses to control actions on the initial computing device that is within network connectivity to the video game controller.

As another example, the network interface is part of the modular interface, and in which the network interface is compatible with the initial computing device. in that example, further comprising a subsequent modular interface that removably connects to the casing's connection point while the initial modular interface is removed, and wherein the subsequent modular interface is compatible with a subsequent computing device that is distinct from the initial computing device. As another example, the initial and subsequent modular interfaces are made from distinct manufacturers. In another example, the initial and subsequent modular interfaces each include buttons as their input mechanisms, and their buttons are positioned differently from each other. As another example, a number of buttons between the initial and subsequent modular interfaces is different. As another example, the initial and subsequent modular interfaces each include buttons as their input mechanisms, and the buttons trigger actions on their respective initial and subsequent computing devices differently from each other. As another example, the subsequent modular interface includes a subsequent network interface that is distinct from the initial network interface, and wherein the subsequent network interface enables connection to the subsequent computing device. As a further example, the sensors include motion and directional sensors which enables a user to directionally manipulate the video game controller to directionally control an avatar in a video game played by the initial computing device. In that example, the video game controller is in a shape of a gun, and the initial modular interface is a handle grip which plugs into the gun's receptacle. A further example includes a display that is attached to and extends from a top of the gun. As another example, the initial modular interface includes multiple sets of buttons, in which each set of buttons serve different action purposes while playing a video game on the initial computing device. As another example, a modular rechargeable battery connects to a battery connection point on the video game controller which is different from the connection point for the initial modular interface.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A modular augmented reality video game controller, comprising:
    a casing having a connection point;
    a network interface which enables the video game controller to connect to an initial computing device;
    one or more processors stored within the casing;
    one or more sensors operatively coupled to the one or more processors, wherein the sensors include motion and directional sensors which enable a user to directionally manipulate the video game controller to directionally control an avatar in a video game played by the initial computing device;
    one or more hardware-based memory devices having instructions which are executable by the one or more processors; and
    an initial modular interface that removably connects to the casing's connection point, wherein the initial modular interface includes input mechanisms which a user uses to control actions on the initial computing device that is within network connectivity to the video game controller,
    wherein the video game controller is in a shape of a gun, and the initial modular interface is a handle grip which plugs into the gun's receptacle.

2. The modular augmented reality video game controller of claim 1, wherein the network interface is part of the initial modular interface, and in which the network interface is compatible with the initial computing device.

3. The modular augmented reality video game controller of claim 2, further comprising a subsequent modular interface that removably connects to the casing's connection point while the initial modular interface is removed, and wherein the subsequent modular interface is compatible with a subsequent computing device that is distinct from the initial computing device.

4. The modular augmented reality video game controller of claim 3, wherein the initial and subsequent modular interfaces are made from distinct manufacturers.

5. The modular augmented reality video game controller of claim 3, wherein the initial and subsequent modular interfaces each include buttons as their input mechanisms, and their buttons are positioned differently from each other.

6. The modular augmented reality video game controller of claim 5, wherein a number of buttons between the initial and subsequent modular interfaces is different.

7. The modular augmented reality video game controller of claim 3, wherein the initial and subsequent modular interfaces each include buttons as their input mechanisms, and the buttons trigger actions on their respective initial and subsequent computing devices differently from each other.

8. The modular augmented reality video game controller of claim 3, where the subsequent modular interface includes a subsequent network interface that is distinct from the initial network interface, and wherein the subsequent network interface enables connection to the subsequent computing device.

9. The modular augmented reality video game controller of claim 1, further comprising a display that is attached to and extends from a top of the gun.

10. The modular augmented reality video game controller of claim 1, wherein the initial modular interface includes multiple sets of buttons, in which each set of buttons serve different action purposes while playing a video game on the initial computing device.

11. The modular augmented reality video game controller of claim 1, wherein a modular rechargeable battery connects to a battery connection point on the video game controller which is different from the connection point for the initial modular interface.

* * * * *